United States Patent
Wu et al.

(10) Patent No.: US 11,381,289 B2
(45) Date of Patent: Jul. 5, 2022

(54) CODEBOOK SUBSET RESTRICTION DESIGN FOR MIMO

(71) Applicant: QUALCOMM Incorporated, San Diego, CA (US)

(72) Inventors: Liangming Wu, Beijing (CN); Yu Zhang, Beijing (CN); Chenxi Hao, Beijing (CN); Chao Wei, Beijing (CN); Wanshi Chen, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/640,150

(22) PCT Filed: Sep. 11, 2018

(86) PCT No.: PCT/CN2018/104994
§ 371 (c)(1),
(2) Date: Feb. 19, 2020

(87) PCT Pub. No.: WO2019/047965
PCT Pub. Date: Mar. 14, 2019

(65) Prior Publication Data
US 2021/0159953 A1   May 27, 2021

(30) Foreign Application Priority Data
Sep. 11, 2017 (WO) ................ PCT/CN2017/101301

(51) Int. Cl.
*H04B 7/04* (2017.01)
*H04B 7/0456* (2017.01)
*H04B 7/06* (2006.01)

(52) U.S. Cl.
CPC ......... *H04B 7/0478* (2013.01); *H04B 7/0639* (2013.01)

(58) Field of Classification Search
CPC ......................... H04B 7/0478; H04B 7/0639
(Continued)

(56) References Cited

U.S. PATENT DOCUMENTS

| 9,698,881 B2 | 7/2017 | Nammi et al. |
| 2014/0016549 A1 | 1/2014 | Novlan et al. |

(Continued)

FOREIGN PATENT DOCUMENTS

| CN | 106330272 A | 1/2017 |
| EP | 3493425 A1 | 6/2019 |
| WO | 2016164073 A1 | 10/2016 |

OTHER PUBLICATIONS

International Search Report and Written Opinion—PCT/CN2018/104994—ISA/EPO—dated Dec. 3, 2018.
(Continued)

*Primary Examiner* — Kevin M Burd
(74) *Attorney, Agent, or Firm* — Qualcomm Incorporated

(57) ABSTRACT

Aspects of the present disclosure relate to techniques for codebook subset restriction (CSR). In some cases, a user equipment (UE) receives, from a network entity, codebook subset restriction (CSR) information. The UE determines, based on the CSR information, a restricted beam set for a plurality of antenna panels, determines precoding matrix indicator (PMI) feedback for the antenna panels subject to restricted beam set, and provides the PMI feedback to the network entity.

25 Claims, 12 Drawing Sheets

(58) Field of Classification Search
USPC .......................................................... 375/267
See application file for complete search history.

(56) References Cited

U.S. PATENT DOCUMENTS

| 2016/0323022 A1* | 11/2016 | Rahman | H04B 7/0469 |
| 2019/0068256 A1* | 2/2019 | Muruganathan | H04B 7/0626 |
| 2020/0186207 A1* | 6/2020 | Davydov | H04B 7/0426 |

OTHER PUBLICATIONS

International Search Report and Written Opinion—PCT/CN2017/101301—ISA/EPO—dated May 22, 2018.
ZTE: "On Reciprocity based CSI Acquisition", 3GPP TSG RAN WG1 NR AdHoc#2, R1-1710189, Jun. 30, 2017, 7 pages.
Intel Corporation: "Discussion on Codebook Subset Restriction for NR", 3GPP TSG RAN WG1 #90, 3GPP Draft; R1-1712546 CBSR, 3rd Generation Partnership Project (3GPP), Mobile Competence Centre; 650, Route Des-Lucioles; F-06921 Sophia-Antipolis Cedex; France, vol. RAN WG1, No. Prague, Czech Republic; Aug. 21, 2017-Aug. 25, 2017, pp. 1-4, Aug. 20, 2017 (Aug. 20, 2017), XP051315362, Retrieved from the Internet: URL: http://vww.3gpp.org/ftp/Meetings_3GPP_SYNC/RAN1/Docs/ [retrieved on Aug. 20, 2017] Sections 2.1, 2.2 and 2.3.
Supplementary European Search Report—EP18853491—Search Authority—Munich—dated Apr. 19, 2021.

\* cited by examiner

CODEBOOK SUBSET RESTRICTION DESIGN FOR MIMO

CROSS-REFERENCE TO RELATED APPLICATION & PRIORITY CLAIM

This application is a national stage application under 35 U.S.C. 371 of PCT/CN2018/104994, filed Sep. 11, 2018, which claims the benefit of and priority to International Patent Cooperation Treaty Application No. PCT/CN2017/101301, filed Sep. 11, 2017, which are both herby assigned to the assignee hereof and hereby expressly incorporated by reference herein as if fully set forth below and for all applicable purposes.

Introduction

Aspects of the present disclosure relate to wireless communications, and more particularly, to codebook subset restriction (CSR).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

As described herein, certain wireless systems may employ directional beams for transmission and reception.

Certain aspects of the present disclosure provide a method for wireless communication that may be performed, for example, by a UE. The method generally includes receiving, from a network entity, codebook subset restriction (CSR) information indicating which beams or phases the UE is restricted from using when reporting a precoding matrix indicator (PMI) for a rank greater than two and at least a threshold number of antenna ports, determining PMI feedback subject to the subject to the restriction indicated by the CSR information, and providing the PMI feedback to the network entity.

Certain aspects of the present disclosure provide a method for wireless communication that may be performed, for example, by a UE. The method generally includes receiving, from a network entity, codebook subset restriction (CSR) information, determining, based on the CSR information, a restricted beam set for a linear combination of beams, determining precoding matrix indicator (PMI) feedback subject to restricted beam set, and providing the PMI feedback to the network entity.

Certain aspects of the present disclosure provide a method for wireless communication that may be performed, for example, by a UE. The method generally includes receiving, from a network entity, codebook subset restriction (CSR) information, determining, based on the CSR information, a restricted beam set for a plurality of antenna panels, determining precoding matrix indicator (PMI) feedback for the antenna panels subject to restricted beam set, and providing the PMI feedback to the network entity.

Certain aspects of the present disclosure provide a method for wireless communication that may be performed, for example, by a UE. The method generally includes receiving codebook subset restriction (CSR) information, determining, based on the CSR information, a restricted beam set for multiple transmission and reception points (TRPs), determining precoding matrix indicator (PMI) feedback for each of the TRPs subject to restricted beam set, and providing the PMI feedback for the TRPs.

Aspects generally include methods, apparatus, systems, computer readable mediums, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
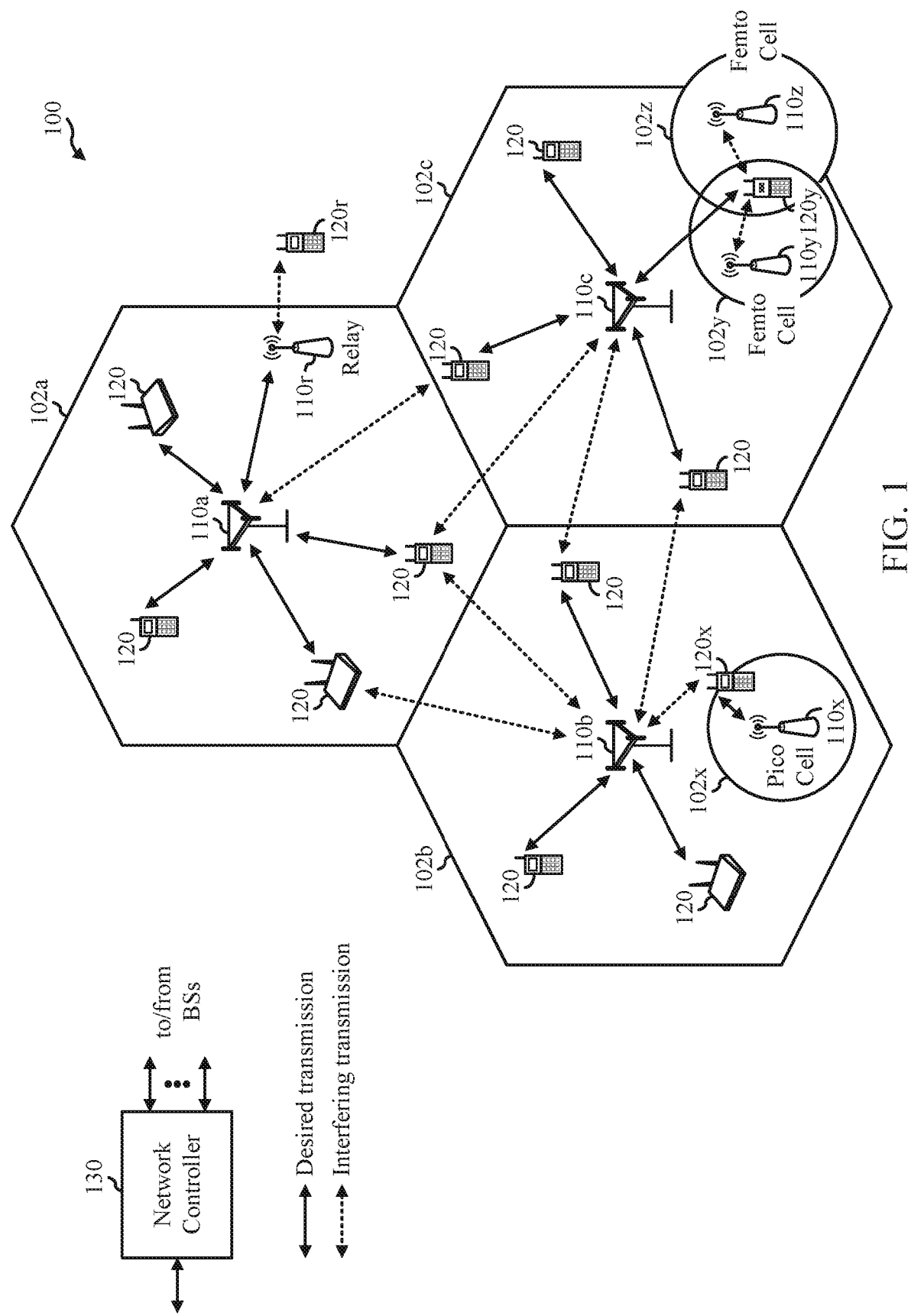
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Certain multi-beam wireless systems, such as mmW systems, bring gigabit speeds to cellular networks, due to availability of large amounts of bandwidth. However, the unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH.

In such systems, the node B (NB) and the user equipment (UE) may communicate using beam-formed transmissions. In order for beamforming to function correctly, the NB may need to monitor beams using beam measurements performed (e.g., based on reference signals transmitted by the NB) and feedback generated at the UE. However, since the direction of a reference signal is unknown to the UE, the UE may need to evaluate several beams to obtain the best Rx beam for a given NB Tx beam. Accordingly, if the UE has to "sweep" through all of its Rx beams to perform the measurements (e.g., to determine the best Rx beam for a given NB Tx beam), the UE may incur significant delay in measurement and battery life impact. Moreover, having to sweep through all Rx beams is highly resource inefficient. Thus, aspects of the present disclosure provide techniques to assist a UE when performing measurements of serving and neighbor cells when using Rx beamforming.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless System

Figure 8:
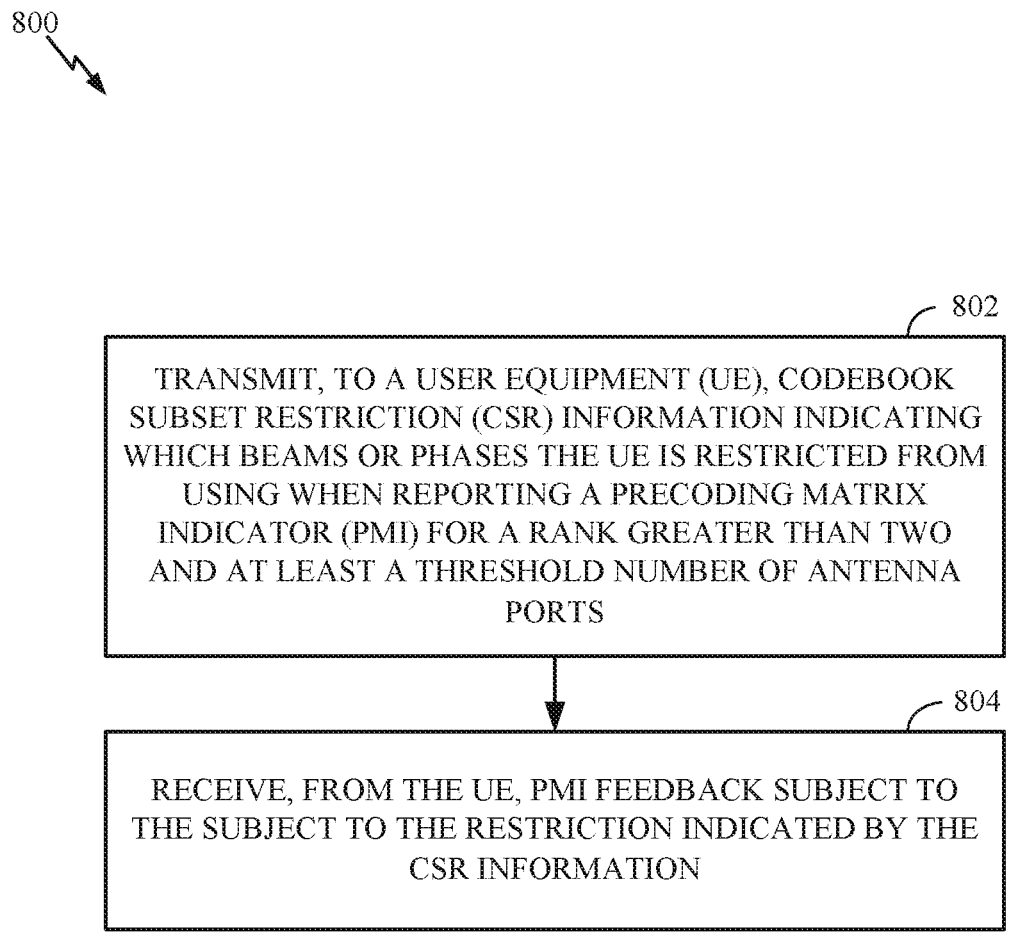
FIG. 8 illustrates example operations that may be performed by a network entity, in accordance with certain aspects of the present disclosure.

FIG. 1 illustrates an example wireless network 100 in which aspects of the present disclosure may be performed. According to an example, the wireless network may be a NR or 5G network which may support mmW communication. mmW communication depends on beamforming to meet link margin. mmW communication may use directional beamforming, so transmission of signaling is directional. Accordingly, a transmitter may focus transmission energy in a certain narrow direction (e.g., beams may have a narrow angle), as illustrated in FIG. 8. A receiving entity may use receiver beamforming to receive the transmitted signaling.

In order to more efficiently use resources and conserve power when communicating using beamforming, the UEs 120 may be configured to perform the operations 900 and methods described herein for UE receiver beamforming. BS 110 may comprise a transmission reception point (TRP), Node B (NB), 5G NB, access point (AP), new radio (NR) BS, Master BS, primary BS, etc.). The NR network 100 may include the central unit.

As illustrated in FIG. 1, the wireless network 100 may include a number of BSs 110 and other network entities. According to one example, the network entities including the BS and UEs may communicate on high frequencies (e.g., >6 GHz) using beams.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
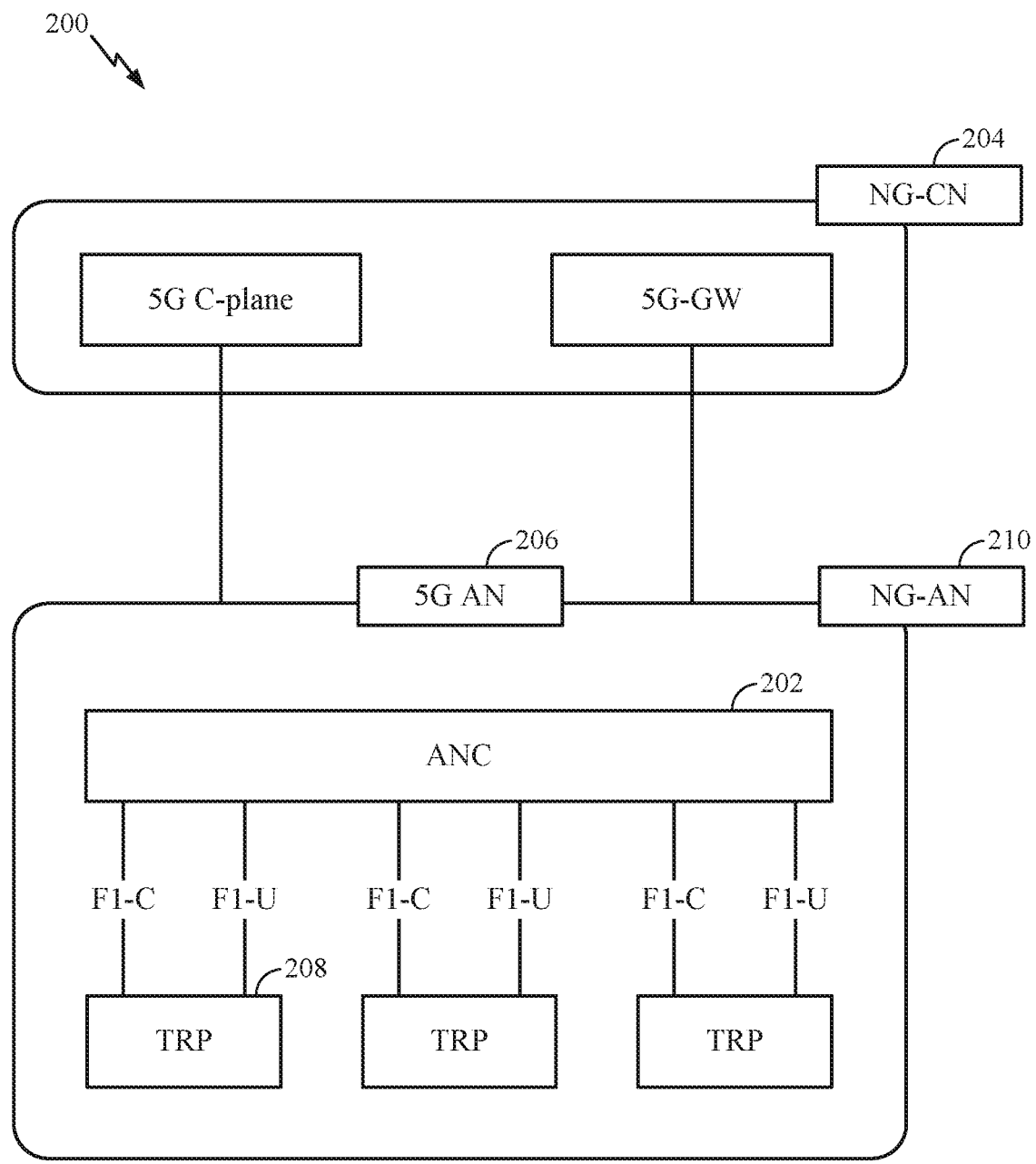
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
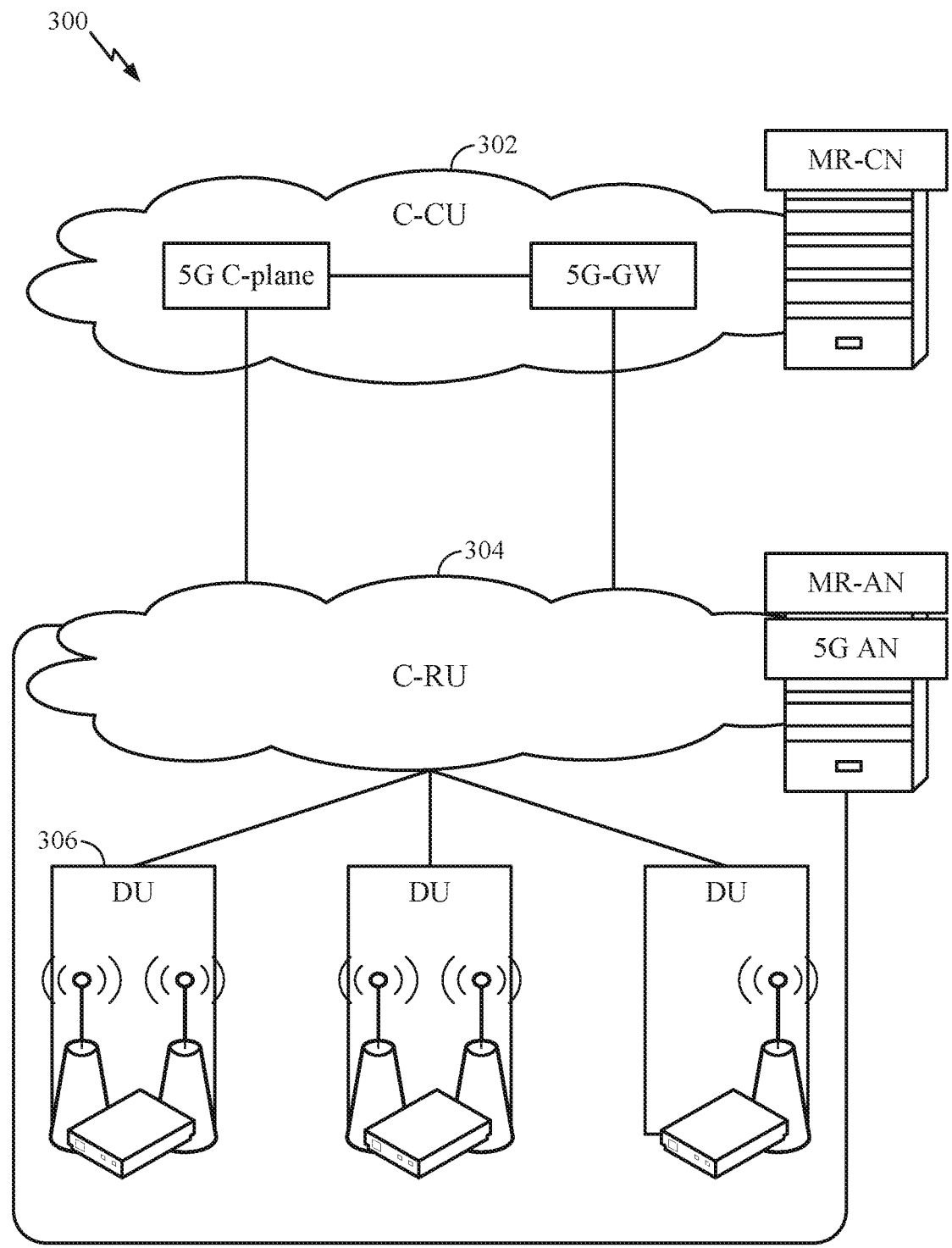
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
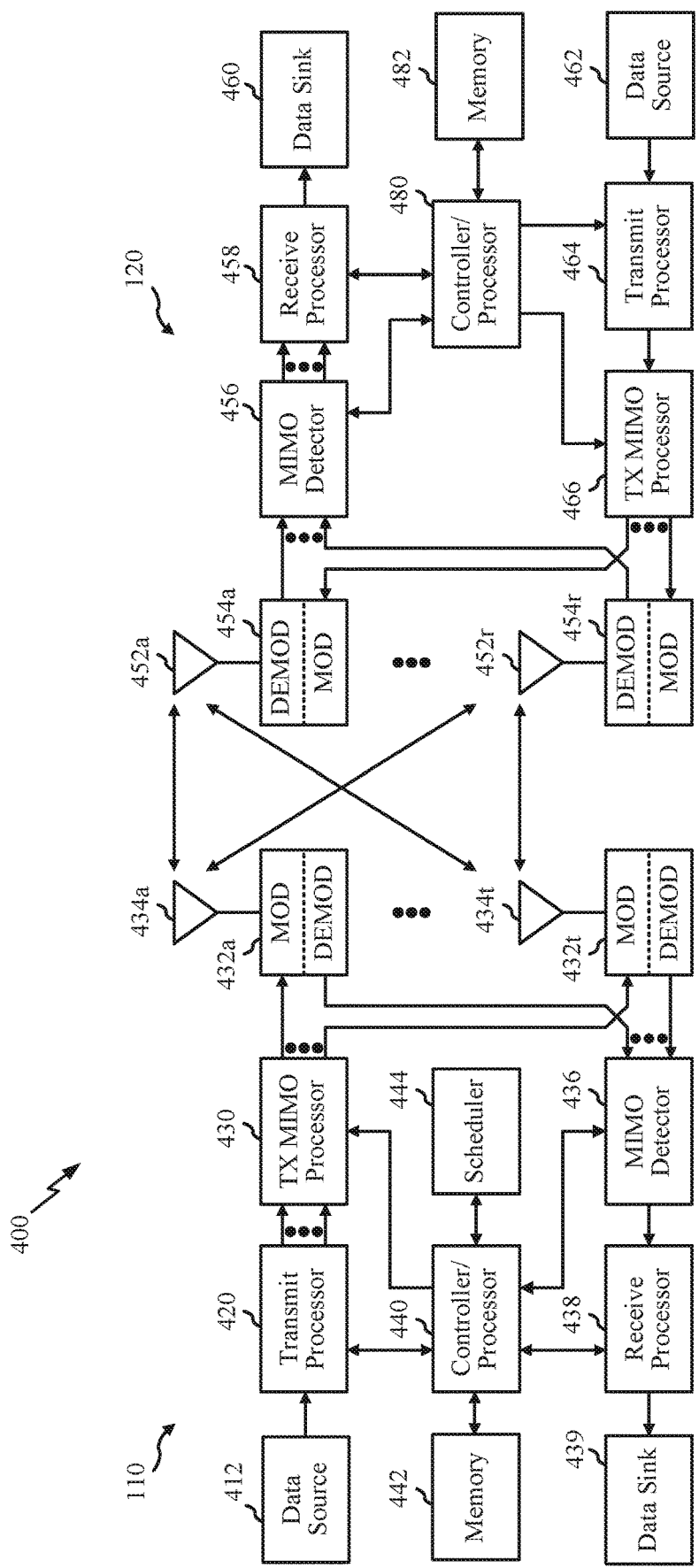
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or gNB.

According to an example, antennas 452, DEMOD/MOD 454, processors 466, 458, 464, and/or controller/processor 480 of the UE 120 may be used to perform the operations described herein and illustrated with reference to FIGS. 9 and 11-12. According to an example, antennas 434, DEMOD/MOD 432, processors 430, 420, 438 and/or controller/processor 440 of the BS 110 may be used to perform the operations described herein and illustrated with reference to FIGS. 10-12.

As an example, one or more of the antennas 452, DEMOD/MOD 454, processors 466, 458, 464, and/or controller/processor 480 of the UE 120 may be configured to perform the operations described herein for UE beam-based tagging. Similarly, one or more of the 434, DEMOD/MOD 432, processors 430, 420, 438 and/or controller/processor 440 of the BS 110 may be configured to perform the operations described herein.

For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. A scheduler 444 may schedule UEs for data transmission on the downlink and/or uplink. The processor 480 and/or other processors and modules at the UE 120 may perform or direct, e.g., the execution of the functional blocks illustrated in FIGS. 9 and 10, and/or other processes for the techniques described herein and those illustrated in the appended drawings. The processor 440 and/or other processors and modules at the BS 110 may perform or direct processes for the techniques described herein and those illustrated in the appended drawings. The memories 442 and 482 may store data and program codes for the BS 110 and the UE 120, respectively.

Figure 5:
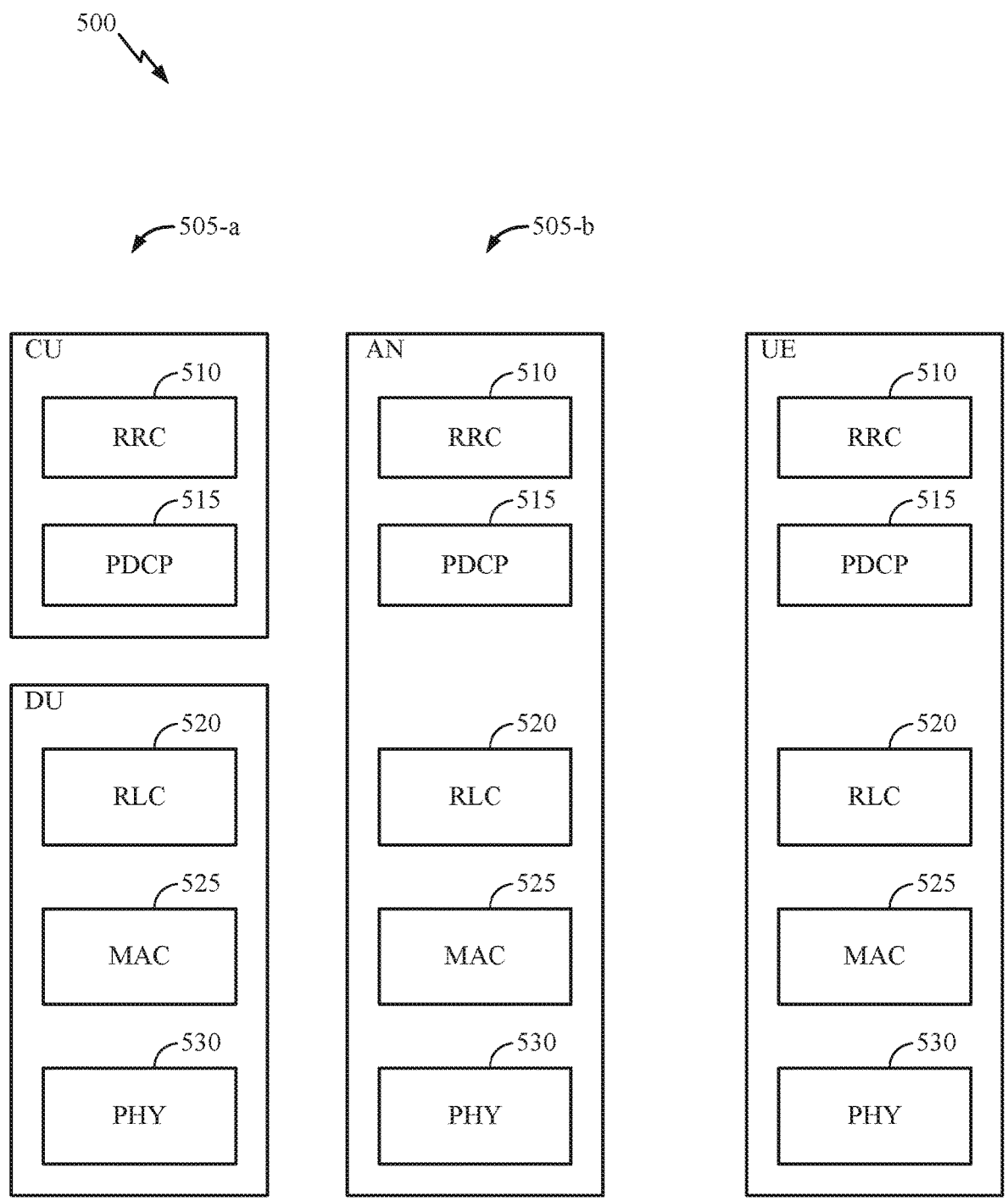
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
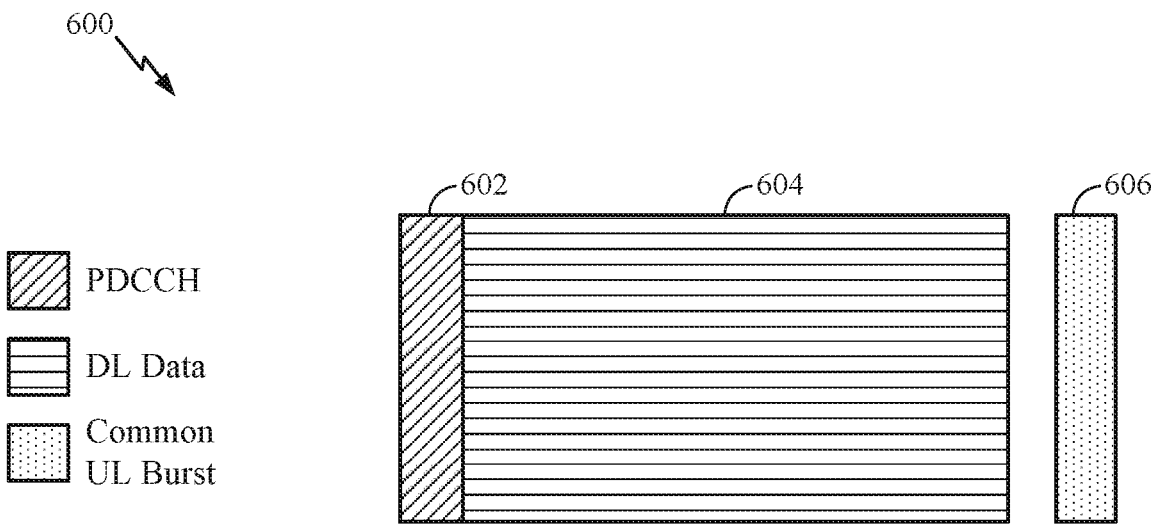
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
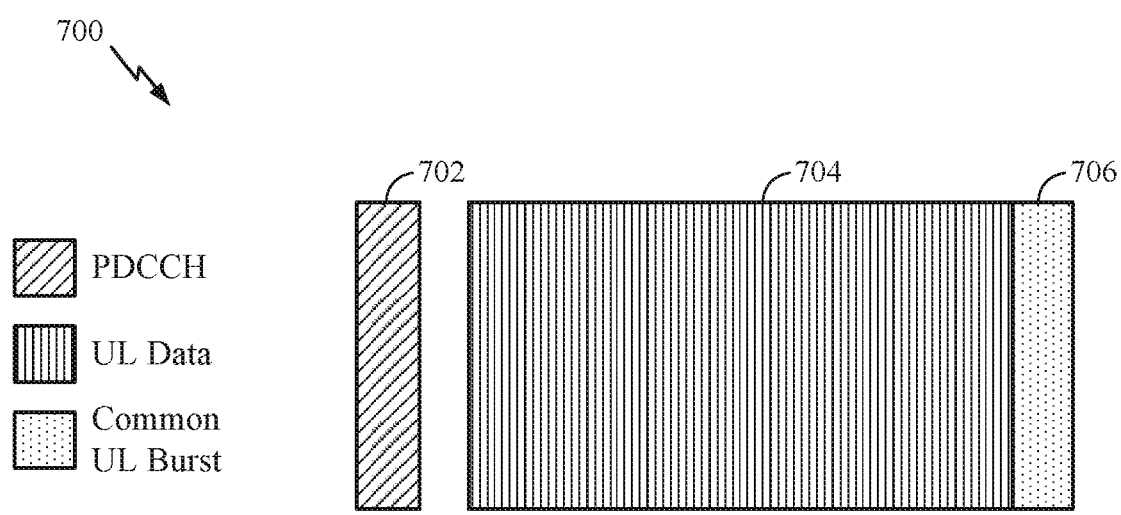
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion 602 described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Codebook Subset Restriction Design for MIMO

Aspects of the present disclosure provide techniques for configuring codebook subset restriction (CSR). CSR generally refers to limiting the amount of antennas (or antenna configurations) for which a UE will report CSI information (e.g., PMI and RI).

CSR provides a convenient way to support different codebook sizes. With CSR a relatively large codebook with many elements may be used by default, with CSR applied where smaller codebooks may be beneficial. With CSR, a subset of precoders (e.g., with each precoder corresponding to a beam) in the codebook may be restricted so that the UE has a smaller set of possible precoders to choose from, effectively reducing the size of the codebook. As a result, a UE may search for a best PMI on the smaller unrestricted set of precoders, which may help reduce UE complexity and processing overhead.

The techniques described herein may be applied for codebook subset restriction design for NR-MIMO in various scenarios. The scenarios may include, for example, Type-I single panel (one antenna panel) rank3~4=16 port CSR, Type-II CSR, and Type-I multipanel CSR.

Current designs codebook designs for rank3~4 is based on 2 subpanel structure. The discrete Fourier transform (DFT) beam length is halved relative to single panel DFT beam designs, with additional phase for inter sub-panel combination. Unfortunately, for ranks higher than 2 (e.g., 3~4) codebook, there is typically no identical DFT beams as compared with other ranks, which can share a set of beams for such a codebook.

Current codebook design for rank 3 and 4 may define a multi-dimensional (e.g. 2D) DFT beam index: $k_1=i_{1,1}$, $k_2=i_{1,2}$. The value of L may be fixed to 1. Calculation and reporting of $i_{1,1}$, $i_{1,2}$ is wideband, $i_{1,1}=0, 1, \ldots, NO_1-1$; $i_{1,2}=0,1, \ldots, N_2O_2-1$ ($\lceil\log(NO_1 \times N_2O_2)\rceil$ bits), where:

$$N = \begin{cases} N_1, & \text{for } <16 \text{ ports} \\ \dfrac{N_1}{2}, & \text{for } \geq 16 \text{ ports}_1 \end{cases}$$

When $N_2=1$, $O_2$ and $i_{1,2}$ may not be applicable. For $\geq 16$ ports:

$$w_{r,l} = \begin{bmatrix} b'_{k_1,k_2} \\ \psi_{m,l} b'_{k_1,k_2} \end{bmatrix} \times c_{r,l}, \text{ where } b'_{k_1,k_2} \text{ corresponds to an}$$

oversampled 2D DFT beam of length-$NN_2$ $$\psi_{m,l} = (-1)^l e^{j\frac{\pi m}{4}}, m \in \{0, 1, 2, 3\}; c_{0,l} = 1, c_{1,l} = (-1)^{\lfloor l/2 \rfloor} e^{j\frac{\pi n}{2}},$$

$n \in \{0, 1\}$

Calculation and reporting of m may be wideband (2 bits), while calculation and reporting of n can be per subband (1 bit/subband).

In some solutions, for rank 3-4 for 16, 24 and 32 ports, Type I single-panel codebooks, PMI restriction may be determined from DFT beam restriction by computing correlation between vectors. If correlation is high, the corresponding PMI may be considered as restricted. Unfortunately, this solution may require relatively high computational effort to check all possible (N*N2*4W1) beams with all restricted beams. Further, a correlation value table of all rank1 and all rank 3 beams (N1*N2*O1*O2*N1/2*N2*O1*O2*4) may need to be created if using a lookup table solution, which will generate relatively large needs for storage.

Aspects of the present disclosure provide techniques that may allow restricted beams or phases to be specified in a relatively simple manner, with relatively low signaling complexity.

FIG. 8 illustrates example operations 800 that may be performed by a network entity (e.g., a base station), in accordance with certain aspects of the present disclosure, to configure a UE to provide Type-1 CSI PMI feedback for single panel rank higher than 2 (e.g., 3~4) and for a number of ports above a threshold value (e.g., =16 port CSR).

Operations 800 being, at 802, by transmitting, to a user equipment (UE), codebook subset restriction (CSR) information indicating which beams or phases the UE is restricted from using when reporting a precoding matrix indicator (PMI) for a rank greater than two and at least a threshold number of antenna ports. At 804, the BS receives, from the UE, PMI feedback subject to the subject to the restriction indicated by the CSR information.

Figure 9:
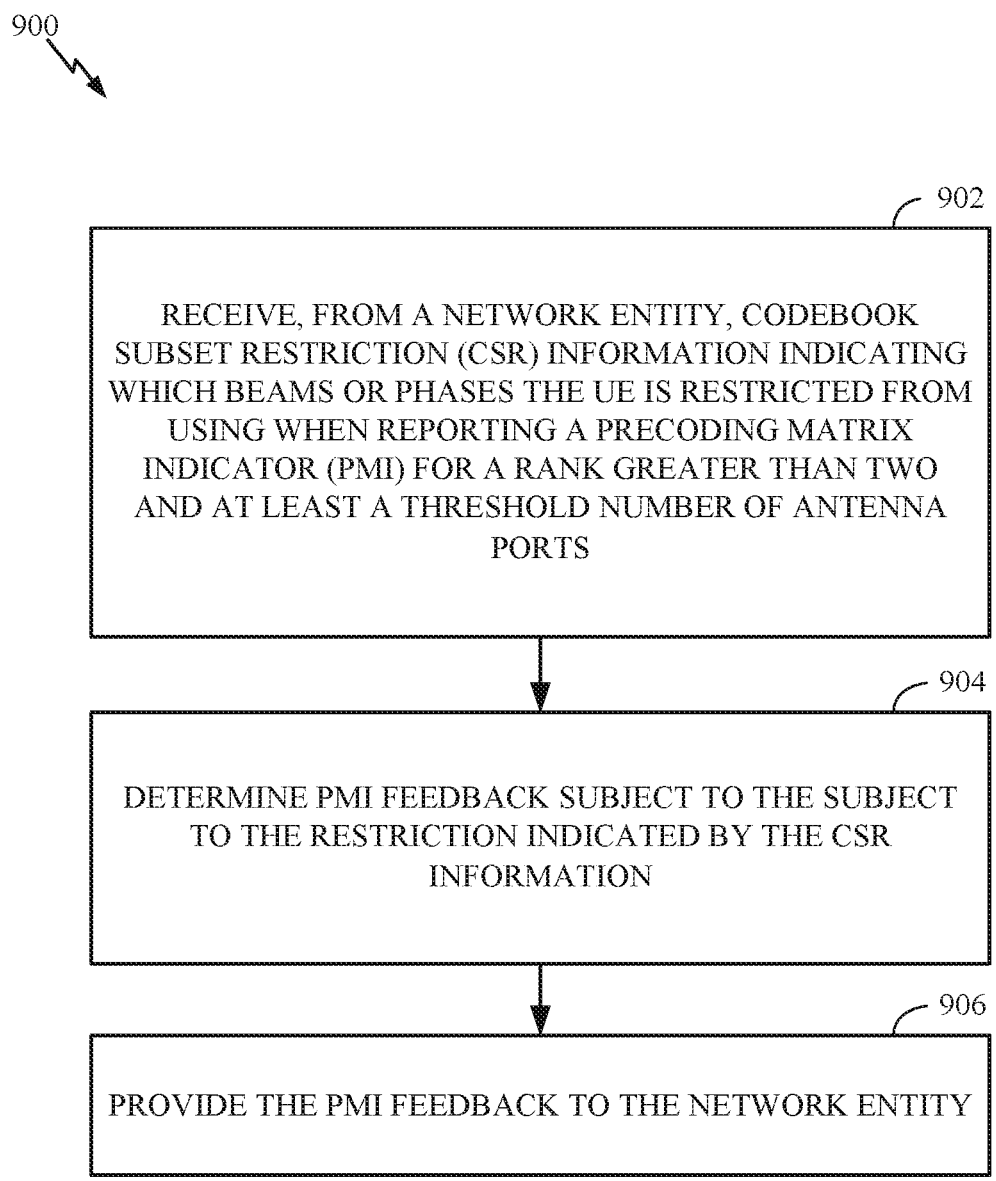
FIG. 9 illustrates example operations that may be performed by a user equipment (UE), in accordance with certain aspects of the present disclosure.

FIG. 9 illustrates example operations 900 that may be performed by a user equipment (UE), in accordance with certain aspects of the present disclosure. The operations may be performed, for example, by a UE to provide PMI feedback to a BS performing operations 800 described above.

Operations 900 being, at 902, by receiving, from a network entity, codebook subset restriction (CSR) information indicating which beams or phases the UE is restricted from using when reporting a precoding matrix indicator (PMB for a rank greater than two and at least a threshold number of antenna ports. At 904, the UE determines PMI feedback subject to the subject to the restriction indicated by the CSR information. At 906, the UE provides the PMI feedback to the network entity.

In some cases, a separate bit-map table for (N1/2)*N2*O1*O2 may be signaled from a base station to the UE (e.g., via high layer signaling or semi-persistent signaling). Each bit-map may indicate one beam for (k1, k2) that defines $b'_{k_1,k_2}$, if the indicator is 1, then $b'_{k_1,k_2}$ not occur in the UE PMI reporting.

In some cases, the UE may receive the Type-I CSR configuration from the base station with N1*N2*O1*O2 beams, which is used for beam restriction for other ranks and rank3~4<=12 ports. A set of restricted beams, which can be represented by $(i_1, i_2)$ for $1^{st}/2^{nd}$ dimension index, may be provided. The restricted beam for rank3~4>=16 ports, indexed with $(j_1, j_2)$, may have a relationship with the $(i_1, i_2)$ indices. A pre-defined mapping relationship of the $(i_1, i_2)$ to $(j_1, j_2)$ may be provided to determine the restricted beam $b'_{j_1,j_2}$ is not included in PMI. In one example, $j'_1=\lfloor i_1/2 \rfloor$, $j'_2=\mod(i_2*N_1*O_1+i_1, N_2*O_2)$. In another example, $j'_1=\lfloor i_1/2 \rfloor$, $j'_2$ is achieved via a lookup table. A mapping rule for $(j'_1, j'_2)$ to $(j_1, j_2)$ may be defined, such as:

$$(j_1,j_2)=(\mod(j'_1+\alpha,B_1),\mod(j'_2+\beta,B_2)),$$

where α and β are the offset candidates set, which can be predefined or configurable:

e.g., $\alpha=\beta=[-1,0,1]$ will create 9 values of $(j_1,j_2)$ e.g., $\alpha=\beta=[0]$, $(j_1,j_2)$ is identical to $(j'_1,j'_2)$.

There are various options for providing phase $(\psi_{m,l})$ restriction for rank3 and rank4. According to one option, a UE may be configured with the restricted set of m for all beams, regardless of whether the beam (j1,j2) is restricted or not:

$$\psi_{m,l} = (-1)^l e^{j\frac{\pi m}{4}}, m \in \{0, 1, 2, 3\}$$

In some cases, a 4 bit bit-map may be used to indicate the restriction/non-restriction for m. According to another option, there may be no restriction of m, only beam restriction.

Figure 10:
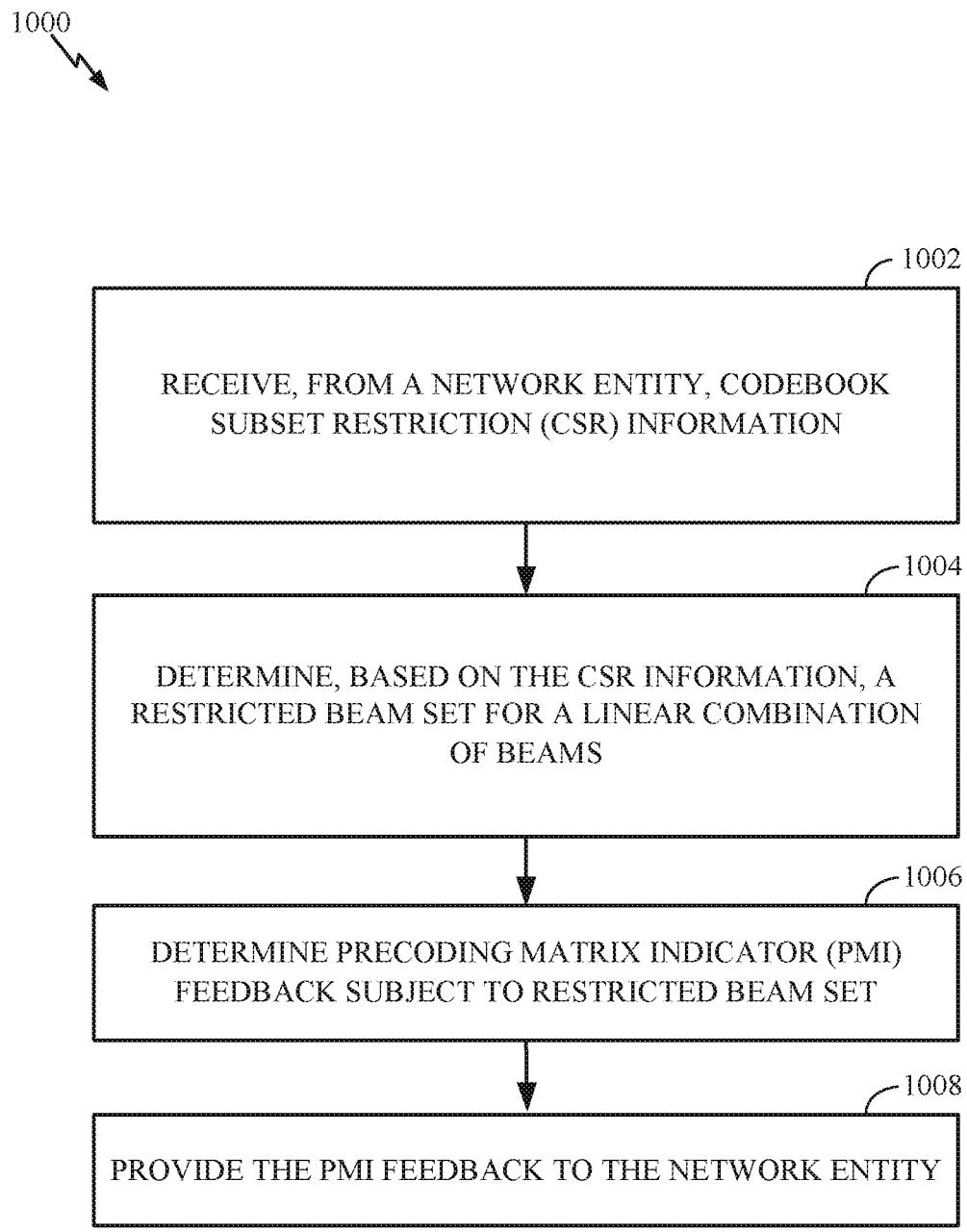
FIG. 10 illustrates example operations that may be performed by a user equipment (UE), in accordance with certain aspects of the present disclosure.

FIG. 10 illustrates example operations 1000 that may be performed by a user equipment (UE), in accordance with certain aspects of the present disclosure. The operations may be performed by a UE for Type-II CSR.

Operations 1000 being, at 1002, by receiving, from a network entity, codebook subset restriction (CSR) information. At 1004, the UE determines, based on the CSR information, a restricted beam set for a linear combination of beams. At 1006, the UE determines precoding matrix indicator (PMI) feedback subject to restricted beam set. At 1008, the UE provides the PMI feedback to the network entity.

Various options may be provided to restrict the beam set for linear combination. According to one option, a same beam restriction table from Type-I CSI may be used.

According to another option, a different beam restriction table may be provided for Type-I and Type-I CSI. In some cases, only the dominant beam used for linear combination is restricted, while the other L−1 beams are not restricted even it is restricted within the CSR bitmap. The dominant beam is typically per-layer defined, and the restricted beam may not be the dominant beam in that particular layer.

In some cases, beams may be restricted based on a wideband amplitude restriction. According to one option, a wideband amplitude restriction (value) may be provided for each of the restricted beams. In such cases, the PMI feedback may not include an amplitude that exceeds the restricted wideband amplitude value if the restricted beam is selected in a linear combination. For example, if there are M beams restricted for Type-I CSR, then for each of the M beams, a Q-bit value may be used for the restricted amplitude. For example, the Q-bit value may be the same as a configured quantization granularity for amplitude feedback (e.g., according to a 2 or 3 bit quantization table). In such cases, total feedback overhead may, thus, be M*Q bits for Type-II CSR According to another option, a single wideband amplitude restriction is provided for all restricted beams. In this case, the PMI feedback may not include the amplitude that exceeds the restricted wideband amplitude value if the restricted beam is selected in linear combination.

Figure 11:
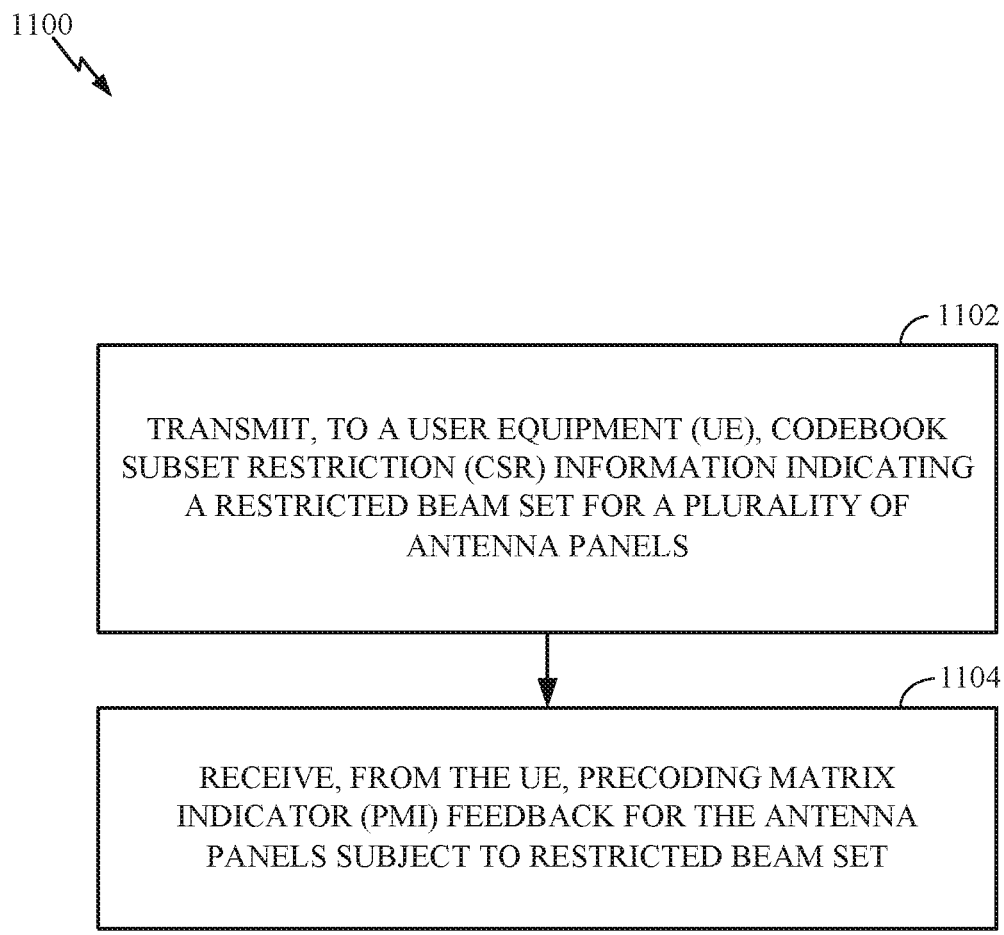
FIG. 11 illustrates example operations that may be performed by a network entity, in accordance with certain aspects of the present disclosure.

FIG. 11 illustrates example operations 1100 that may be performed by a network entity (e.g., a base station), in accordance with certain aspects of the present disclosure, to configure a UE to provide Type-I multi-panel CSR.

Operations 1100 being, at 1102, by transmitting, to a user equipment (UE), codebook subset restriction (CSR) information indicating a restricted beam set for a plurality of antenna panels. At 1104, the BS receives, from the UE, precoding matrix indicator (PMI) feedback for the antenna panels subject to restricted beam set.

Figure 12:
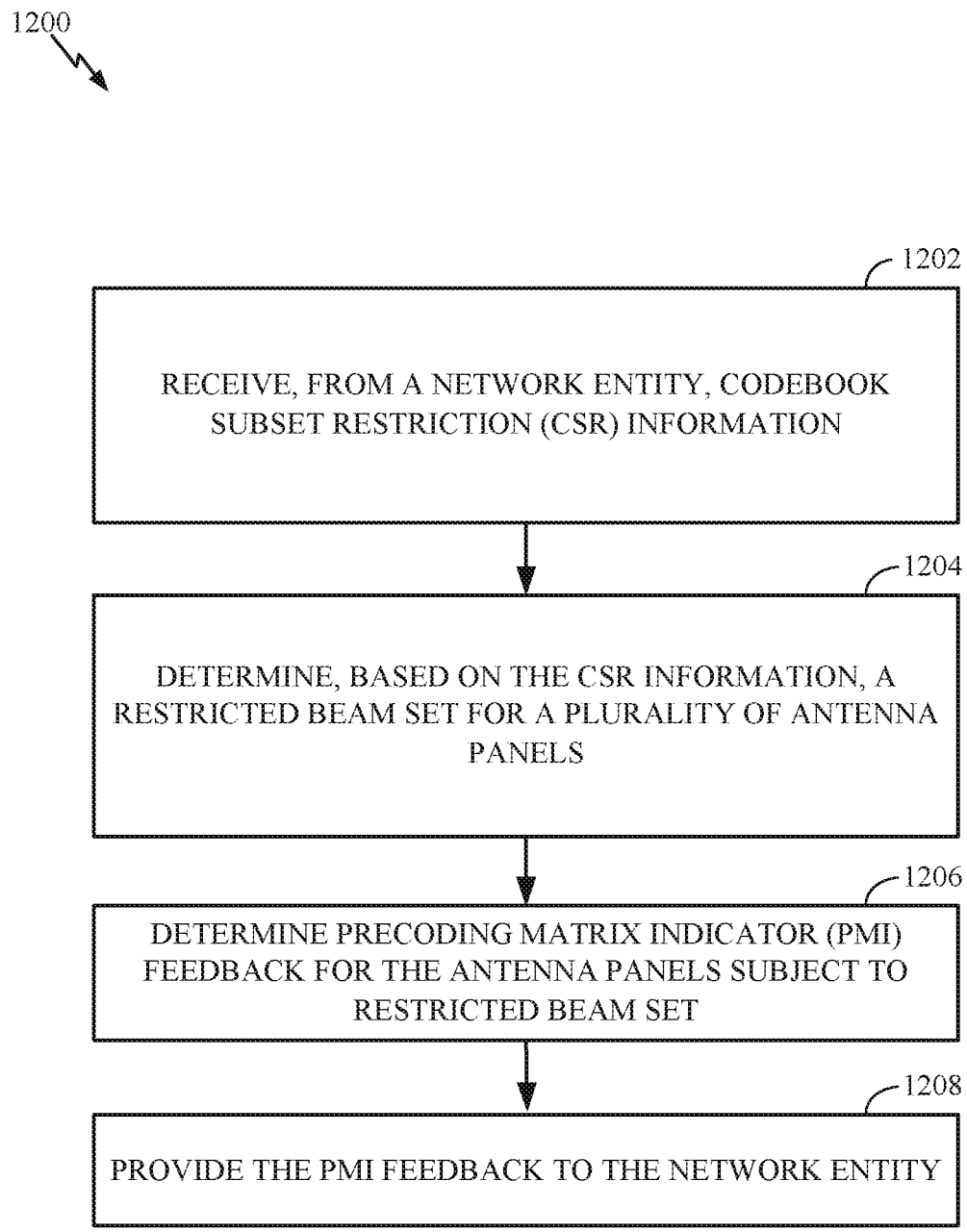
FIG. 12 illustrates example operations that may be performed by a user equipment (UE), in accordance with certain aspects of the present disclosure.

FIG. 12 illustrates example operations 1200 that may be performed by a user equipment (UE), in accordance with certain aspects of the present disclosure. The operations may be performed, for example, by a UE to provide Type-I multi-panel CSR to a BS performing operations 1100 described above.

Operations 1200 being, at 1202, by receiving, from a network entity, codebook subset restriction (CSR) information. At 1204, the UE determines, based on the CSR information, a restricted beam set for a plurality of antenna panels. At 1206, the UE determines precoding matrix indicator (PMI) feedback for the antenna panels subject to restricted beam set. At 1208, the UE provides the PMI feedback to the network entity.

According to one option, a bit map similar to that used for Type-I single panel CSR may be provided, such that a bit map of $N_1N_2O_1O_2$ is indicated to UE, and the PMI for any panel should not select the beam if it is restricted. According to another option, a bit map similar to Type-I single panel CSR may be provided, such that a bit map of $N_1N_2O_1O_2$ is indicated to UE, and a 4-bit interpanel cophase for all panels may be indicated to the UE. PMI that includes either the restricted beam or the restricted interpanel cophase for all panels may be restricted.

According to another option, a bit map similar to Type-I single panel CSR may be provided, such that a bit map of $N_1N_2O_1O_2$ is indicated to the UE. A 4-bit interpanel cophase for each panel may be indicated to the UE, such that the total number of bits is 4*(Ng−1). The PMI that includes either the restricted beam or the restricted interpanel cophase for a given panel may be restricted.

According to still another option, a bit map similar to Type-I single panel CSR is provided, such that a bit map of $N_1N_2O_1O_2$ is indicated to the UE and, for each restricted beam, a separate configuration of cophase for each panel may be provided. The PMI that includes both the restricted beam and the restricted cophase may be restricted. The cophase may be represented, for example, in a bit-map way (e.g., $4^{Ng-1}$ bits for each restricted beam). As an alternative, the cophase may be represented in an indexed way, i.e. if J cophase combinations needs to be restricted, then J*2*(Ng−1) (2 means the QPSK index) bits shall be used for each restricted beam.

Figure 13:
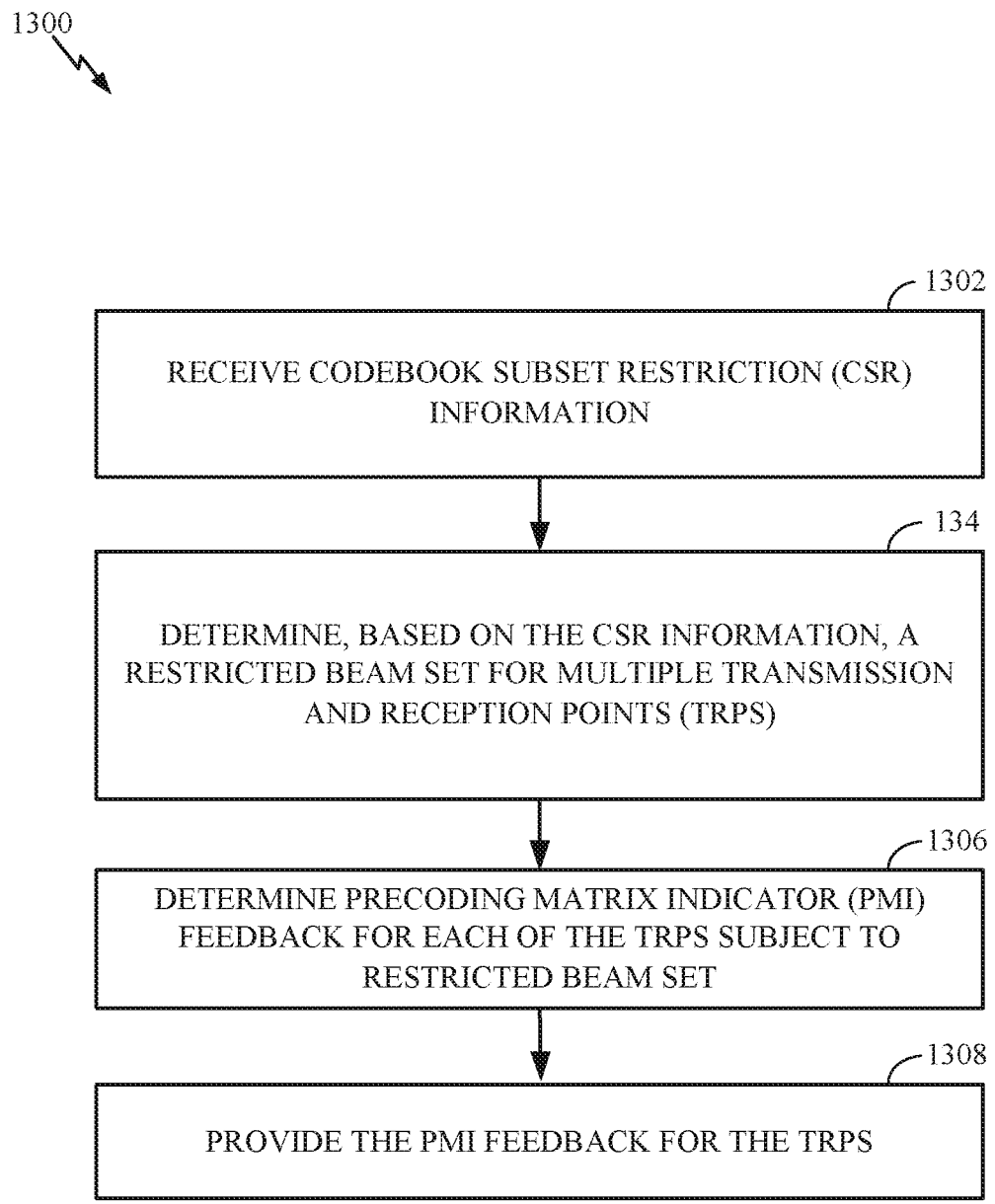
FIG. 13 illustrates example operations that may be performed by a user equipment (UE), in accordance with certain aspects of the present disclosure.

FIG. 13 illustrates example operations 1300 that may be performed by a user equipment (UE), in accordance with certain aspects of the present disclosure. The operations may be performed by a UE for Multi-TRP CSR Operations 1300 being, at 1302, by receiving codebook subset restriction (CSR) information. At 1304, the UE determines, based on the CSR information, a restricted beam set for multiple transmission and reception points (TRPs). At 1306, the UE determines precoding matrix indicator (PMI) feedback for each of the TRPs subject to restricted beam set. At 1308, the UE provides the PMI feedback for the TRPs.

If multi-TRP CSI is configured, a UE may need to feedback CSI to multiple TRPs. In such cases, a similar beam restriction bit map table may be provided for each TRP. The UE may calculate and report CSI for each TRP. The reported PMI should not include the restricted beam for a correspondent TRP. The CSR restriction may be applied to both non-coherent or coherent multi-TRP CSI feedback. The bit-map tables for multi-TRPs CSR may be configured from the serving TRP.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving, from a network entity, codebook subset restriction (CSR) information, wherein a multi-bit restricted interpanel cophase value is provided in the CSR information for each panel of a plurality of antenna panels;
   determining, based on the CSR information, a restricted beam set for the plurality of antenna panels;
   determining precoding matrix indicator (PMI) feedback for the antenna panels subject to restricted beam set, wherein determining the PMI feedback comprises excluding, from the PMI feedback, PMI that includes both a restricted beam and a restricted cophase; and
   providing the PMI feedback to the network entity.

2. The method of claim 1, wherein the CSR information comprises a bitmap, wherein each bit of the bitmap indicates whether the PMI for any of the antenna panels of the plurality of antenna panels should not include a corresponding restricted beam.

3. The method of claim 1, wherein the multi-bit restricted interpanel cophase value is provided via:
   a bitmap for each restricted beam; or
   an indexed manner that indicates a cophase combination to be restricted.

4. A method for wireless communications by a user equipment (UE), comprising:
   receiving, from a network entity, codebook subset restriction (CSR) information indicating which beams or phases the UE is restricted from using when reporting precoding matrix indicator (PMI) feedback for a rank greater than two and at least a threshold number of antenna ports;
   determining the PMI feedback subject to the restriction indicated by the CSR information, wherein determining the PMI feedback comprises determining which beams or phases the UE is restricted from using when reporting the PMI feedback for the rank greater than two and the at least the threshold number of antenna ports based on beam restrictions indicated in the CSR information for a rank of two or less or a rank greater than two and less than the threshold number of antenna ports; and
providing the PMI feedback to the network entity.

5. The method of claim 4, wherein the threshold number of antenna ports is greater than or equal to 16.

6. The method of claim 4, wherein the CSR information comprises:
   a bit-map, wherein each bit of the bit-map indicates whether a corresponding beam is restricted from occurring in the PMI feedback.

7. The method of claim 6, wherein each beam corresponds to an oversampled multi-dimensional discrete Fourier transform (DFT) beam.

8. The method of claim 4, wherein:
   the UE is configured to determine which beams or phases the UE is restricted from using based on a first set of indices of beams indicated as restricted via the CSR information.

9. The method of claim 8, wherein the UE is configured to determine which beams or phases the UE is restricted from using based on a mapping of the first set of indices of beams to a second set of indices of beams.

10. The method of claim 8, wherein the UE is configured to determine which beams or phases the UE is restricted from using based on the first set of indices of beams and a lookup table.

11. The method of claim 4, wherein the CSR information comprises a bitmap indicating which phases the UE is restricted from using.

12. The method of claim 11, wherein the bitmap indicates which phases for all beams are restricted, regardless of which beams are restricted.

13. A method for wireless communications by a network entity, comprising:
   transmitting, to a user equipment (UE), codebook subset restriction (CSR) information indicating a restricted beam set for a plurality of antenna panels, wherein a multi-bit restricted interpanel cophase value is provided in the CSR information for each panel of the plurality of antenna panels; and
   receiving, from the UE, precoding matrix indicator (PMI) feedback for the antenna panels subject to restricted beam set, wherein PMI that includes both a restricted beam and a restricted cophase are restricted from the PMI feedback.

14. The method of claim 13, wherein the CSR information comprises a bitmap, wherein each bit of the bitmap indicates whether the PMI for any of the antenna panels of the plurality of antenna panels should not include a corresponding restricted beam.

15. The method of claim 13, wherein the multi-bit restricted interpanel cophase value is provided via:
   a bitmap for each restricted beam; or
   an indexed manner that indicates a cophase combination to be restricted.

16. A method for wireless communications by a network entity, comprising:
   transmitting, to a user equipment (UE), codebook subset restriction (CSR) information indicating which beams or phases the UE is restricted from using when reporting precoding matrix indicator (PMI) feedback for a rank greater than two and at least a threshold number of antenna ports, wherein the CSR information includes beam restrictions for a rank of two or less or a rank greater than two and less than the threshold number of antenna ports; and
   receiving, from the UE, PMI feedback subject to the restriction indicated by the CSR information, wherein the PMI feedback for the rank greater than two and at least the threshold number of antenna ports is based on the beam restrictions for the rank of two or less or the rank greater than two and less than the threshold number of antenna ports.

17. The method of claim 16, wherein the threshold number of antenna ports is greater than or equal to 16.

18. The method of claim 16, wherein the CSR information comprises:
   a bit-map, wherein each bit of the bit-map indicates whether a corresponding beam is restricted from occurring in the PMI feedback.

19. The method of claim 18, wherein each beam corresponds to an oversampled multi-dimensional discrete Fourier transform (DFT) beam.

20. The method of claim 16, wherein the CSR information comprises a bitmap indicating which phases the UE is restricted from using.

21. The method of claim 20, wherein the bitmap indicates which phases for all beams are restricted, regardless of which beams are restricted.

22. An apparatus for wireless communications by a user equipment (UE), comprising:
   means for receiving, from a network entity, codebook subset restriction (CSR) information, wherein a multi-bit restricted interpanel cophase value is provided in the CSR information for each panel of a plurality of antenna panels;
   means for determining, based on the CSR information, a restricted beam set for the plurality of antenna panels;
   means for determining precoding matrix indicator (PMI) feedback for the antenna panels subject to restricted beam set, wherein the means for determining the PMI feedback comprise means for excluding, from the PMI feedback, PMI that includes both a restricted beam and a restricted cophase; and
   means for providing the PMI feedback to the network entity.

23. An apparatus for wireless communications by a user equipment (UE), comprising:
   means for receiving, from a network entity, codebook subset restriction (CSR) information indicating which beams or phases the UE is restricted from using when reporting precoding matrix indicator (PMI) feedback for a rank greater than two and at least a threshold number of antenna ports;
   means for determining PMI feedback subject to the restriction indicated by the CSR information, wherein the means for determining the PMI feedback comprises means for determining which beams or phases the UE is restricted from using when reporting the PMI feedback for the rank greater than two and the at least the threshold number of antenna ports based on beam restrictions indicated in the CSR information for a rank of two or less or a rank greater than two and less than the threshold number of antenna ports; and
   means for providing the PMI feedback to the network entity.

24. An apparatus for wireless communications by a network entity, comprising:
- means for transmitting, to a user equipment (UE), codebook subset restriction (CSR) information indicating a restricted beam set for a plurality of antenna panels, wherein a multi-bit restricted interpanel cophase value is provided in the CSR information for each panel of the plurality of antenna panels; and
- means for receiving, from the UE, precoding matrix indicator (PMI) feedback for the antenna panels subject to restricted beam set, wherein PMI that includes both a restricted beam and a restricted cophase are restricted from the PMI feedback.

25. An apparatus for wireless communications by a network entity, comprising:
- means for transmitting, to a user equipment (UE), codebook subset restriction (CSR) information indicating which beams or phases the UE is restricted from using when reporting a precoding matrix indicator (PMI) for a rank greater than two and at least a threshold number of antenna ports, wherein the CSR information includes beam restrictions for a rank of two or less or a rank greater than two and less than the threshold number of antenna ports; and
- means for receiving, from the UE, PMI feedback subject to the restriction indicated by the CSR information, wherein the PMI feedback for the rank greater than two and at least the threshold number of antenna ports is based on the beam restrictions for the rank of two or less or the rank greater than two and less than the threshold number of antenna ports.

* * * * *